US012565285B2

(12) United States Patent (10) Patent No.: US 12,565,285 B2
Moia et al. (45) Date of Patent: Mar. 3, 2026

(54) ELECTRICALLY PROPELLED TWO-WHEELED VEHICLE AND METHOD FOR ADJUSTING A DRIVE TORQUE OF AN ELECTRICALLY PROPELLED TWO-WHEELED VEHICLE

(71) Applicant: Robert Bosch GmbH, Stuttgart (DE)

(72) Inventors: Alessandro Moia, Holzgerlingen (DE); Daniel Baumgaertner, Tuebingen (DE); Felix Dauer, Tuebingen (DE); Joseph Reck, Filderstadt (DE); Silas Klug, Magstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 762 days.

(21) Appl. No.: 17/854,446

(22) Filed: Jun. 30, 2022

(65) Prior Publication Data

US 2023/0035844 A1 Feb. 2, 2023

(30) Foreign Application Priority Data

Jul. 28, 2021 (DE) ..................... 10 2021 208 154.1

(51) Int. Cl.
*B62M 6/50* (2010.01)
*B62M 6/55* (2010.01)

(52) U.S. Cl.
CPC ............... *B62M 6/50* (2013.01); *B62M 6/55* (2013.01)

(58) Field of Classification Search
CPC ....... B62M 6/50; B62M 6/55; B62K 2204/00; B62J 45/41; B62J 45/4152; Y02T 10/72
(Continued)

(56) References Cited

U.S. PATENT DOCUMENTS

| 11,530,920 B2 * | 12/2022 | Krone | ..................... G01S 19/49 |
| 2011/0295454 A1 * | 12/2011 | Meyers | .................. B62K 11/10 |
| | | | 180/219 |

(Continued)

FOREIGN PATENT DOCUMENTS

| DE | 19532521 C2 * | 11/2002 | .............. B62J 27/00 |
| DE | 102011004587 A1 | 8/2012 | |

(Continued)

OTHER PUBLICATIONS

Schröter, Kai, Raphael Pleß, and Patrick Seiniger. "Vehicle Dynamics Control Systems for Motorcycles." Handbook of Driver Assistance Systems. Ed. by Felix Lotz et al. Cham: Springer International Publishing, 2016. 969-1006. Web. (Year: 2016).*

*Primary Examiner* — Ramya P Burgess
*Assistant Examiner* — Keith A von Volkenburg
(74) *Attorney, Agent, or Firm* — NORTON ROSE FULBRIGHT US LLP

(57) ABSTRACT

An electrically propelled two-wheeled vehicle and a method for adjusting a drive torque of an electrically propelled two-wheeled vehicle. The electrically propelled two-wheeled vehicle includes: a sensor, based on which a pitch rate of the electrically propelled two-wheeled vehicle is ascertainable; a device for influencing a drive torque of the electrically propelled two-wheeled vehicle; and an evaluation unit configured to compare a pitch rate, which is ascertained on the basis of the sensor and represents a pitch rate of the electrically propelled two-wheeled vehicle relative to the surroundings of the two-wheeled vehicle, to a predefined, static pitch rate threshold value, and configured to reduce a drive torque acting upon a drive train of the electrically propelled two-wheeled vehicle using a predefined amplification factor, if a pitch rate generated by an upward movement of a front wheel of the electrically
(Continued)

propelled two-wheeled vehicle exceeds the static pitch rate threshold value.

15 Claims, 3 Drawing Sheets

(58) Field of Classification Search
USPC ........................................................... 701/22
See application file for complete search history.

(56) References Cited

U.S. PATENT DOCUMENTS

| | | | |
|---|---|---|---|
| 2012/0031696 A1 | 2/2012 | Wagner | |
| 2019/0054979 A1* | 2/2019 | Stegmaier | B62M 6/55 |
| 2020/0198561 A1* | 6/2020 | Weed | B60R 16/03 |
| 2020/0355318 A1* | 11/2020 | Parnofiello | B60K 13/02 |
| 2021/0026358 A1* | 1/2021 | Sheu | G05D 1/0274 |
| 2021/0088673 A1* | 3/2021 | Stählin | G01S 19/52 |
| 2021/0215483 A1* | 7/2021 | Krone | G01S 19/14 |
| 2022/0080971 A1* | 3/2022 | Bolger | B60W 30/182 |
| 2022/0161874 A1* | 5/2022 | Nahidi | B62D 35/005 |
| 2022/0212742 A1* | 7/2022 | Ogahara | B62J 45/412 |

FOREIGN PATENT DOCUMENTS

| | | | | |
|---|---|---|---|---|
| DE | 102012009203 A1 * | 11/2013 | | B60K 28/10 |
| DE | 102012009203 B4 | 8/2014 | | |
| DE | 102015000931 A1 * | 7/2016 | | B60L 15/2009 |
| DE | 102016215870 A1 | 10/2017 | | |
| DE | 102019122058 A1 | 2/2020 | | |
| DE | 102019218865 A1 | 6/2021 | | |
| GB | 2386103 A | 9/2003 | | |
| WO | 2007020271 A1 | 2/2007 | | |
| WO | WO-2015133396 A1 * | 9/2015 | | B60K 28/14 |

* cited by examiner

ELECTRICALLY PROPELLED TWO-WHEELED VEHICLE AND METHOD FOR ADJUSTING A DRIVE TORQUE OF AN ELECTRICALLY PROPELLED TWO-WHEELED VEHICLE

CROSS REFERENCE

The present application claims the benefit under 35 U.S.C. § 119 of German Patent Application No. DE 10 2021 208 154.1 filed on Jul. 28, 2021, which is expressly incorporated herein by reference in its entirety.

BACKGROUND INFORMATION

The present invention relates to an electrically propelled two-wheeled vehicle and a method for adjusting a drive torque of an electrically propelled two-wheeled vehicle.

There are vehicle dynamics control systems for motorcycles, which prevent, inter alia, a front wheel from lifting off. Such a function is normally based on an incremental wheel-speed sensor system, which is installed as standard at front and rear wheels of the motorcycles due to a requisite ABS system for motorcycles.

However, in connection with electrically propelled two-wheeled vehicles, such as pedelecs, electric bicycles, etc., a wheel-speed sensor system is normally used, which generates only one single measured value (pulse) per wheel revolution, and which is generally provided exclusively at the rear wheel of the bicycle.

In addition, methods of estimating a vehicle angle, which are based on an inertial sensor and require a high-resolution wheel-speed sensor system, are in the related art.

German Patent Application No. DE 10 2011 004 587 A1 relates to a method for determining an inclined position of a vehicle. With the aid of a sensor, whose measuring axis is inclined with respect to the longitudinal axis by a pitch angle, a rate of rotation having a roll-rate component and a yaw-rate component is measured. A roll angle for describing the inclined position of the vehicle is ultimately ascertained from the rate of rotation.

German Patent Application No. DE 10 2019 122 058 A1 describes a control device for a vehicle, e.g., for an e-bike, as well as a drive unit for such a vehicle. A control variant implemented by the control device provides for an assisting force generated by a motor to be applied to the vehicle in a case, in which an obstacle is cleared, while the assisting force is reduced in the case, in which a "wheelie" is detected. For this, the control device includes a detector, which is equipped to detect a pitch angle of the vehicle body.

German Patent Application No. DE 10 2012 009 203 B4 describes a two-wheeled vehicle, such as an electric bicycle, which includes a driving device for driving the rear wheel and a setting unit operated by a rider for setting an acceleration request for the driving device and for initiating a ride on the rear wheel without any contact of the front wheel with the road surface ("wheelie maneuver"). In addition, the vehicle includes a detector for measuring an actual value of the angle of inclination, as well as an electronic control device for controlling the angle of inclination during the trip on the rear wheel.

German Patent Application No. DE 10 2016 215 870 A1 describes a method and a device for identifying a position of a two-wheeled vehicle, in particular, on the basis of a 3-axis acceleration sensor or inertial sensor. A position information item, which corresponds, for example, to the roll angle and/or the pitch angle of the two-wheeled vehicle, is derived from specific sensor variables; detection of a fall being able to be carried out on the basis of the position information item.

SUMMARY

An electrically propelled two-wheeled vehicle of the present invention may have the advantage that lift-off of a front wheel of an electrically propelled two-wheeled vehicle is ascertainable and reducible with a particularly high level of reliability, which means that a high level of safety is rendered possible during operation of such a two-wheeled vehicle. For this, an electrically propelled two-wheeled vehicle of the present invention is provided a sensor, on the basis of which a pitch rate of the electrically propelled two-wheeled vehicle is ascertainable directly or indirectly. In addition, in accordance with an example embodiment of the present invention, a device for influencing a drive torque of the electrically propelled two-wheeled vehicle is provided: the drive torque being intended to be viewed as a resulting torque, which is made up of all of the torques acting upon the drive train (e.g., a torque introduced by the pedaling of a rider, a torque of an assisting motor, etc.). In addition, the electrically propelled two-wheeled vehicle includes an evaluation unit, which takes, for example, the form of an ASIC, FPGA, processor, digital signal processor, microcontroller, or the like. The evaluation unit is configured to compare a pitch rate to a predefined, static pitch rate threshold value, the pitch rate being ascertained on the basis of the sensor and representing a pitch rate of the electrically propelled two-wheeled vehicle relative to the surroundings of the two-wheeled vehicle and, in particular, relative to the horizon. The static pitch rate threshold value is stored, for example, in a storage unit connected to the evaluation unit in a manner allowing exchange of information. The static pitch rate threshold value is set, for example, in concordance with a specific embodiment (e.g., a model or a line of models) of the electrically propelled two-wheeled vehicle. Alternatively, or in addition, it is also possible for the static pitch rate threshold value to be set by a rider input and/or to be changed (e.g., as a function of a rider preference and/or of a weight of the rider and/or of a loading and/or as a function of an elevation profile and/or of a type of road, etc.). The evaluation unit is further configured to reduce the drive torque acting upon the drive train of the electrically propelled two-wheeled vehicle with the aid of a predefined amplification factor, if a pitch rate generated by an upward movement of a front wheel of the electrically propelled two-wheeled vehicle exceeds the static pitch rate threshold value. The reduced drive torque is also called setpoint drive torque in the following description, since this represents the resulting torque to be applied actually to the drive train. In this description, an upward movement of the front wheel corresponds to negative values of pitch rate, which is why the pitch rate threshold value is defined here as a negative value and exceedance of the pitch rate threshold value then occurs accordingly, if the values of the pitch rate become more negative than the pitch rate threshold value (that is, the threshold pitch rate value is exceeded in the negative direction). The static pitch rate threshold value allows prevention of any erroneous actions by the evaluation unit due to small pitching movements of the bicycle, which do not result from lift-off of the front wheel but originate, for example, from pedaling, excitation from the ground, or vibrations of the chassis. Accordingly, the pitch rate threshold value and/or the amplification factor are preferably set in such a manner, that lift-off of the front wheel of the electrically propelled two-wheeled vehicle due to control, present here, of the drive torque on the basis of the pitch rate, is prevented to the greatest possible extent. The use of the pitch rate in accordance with the present invention advantageously prevents roadway gradients from erroneously having a lasting effect on a reduction of the drive torque.

Preferred further refinements of the present invention are disclosed herein.

In accordance with an example embodiment of the present invention, the sensor, on the basis of which a pitch rate of the electrically propelled two-wheeled vehicle is ascertainable, takes the form of, for example, a rate-of-rotation sensor, in particular, a 3-D rate-of-rotation sensor (which is configured to measure, in each instance, rates of rotation about a transverse axis and/or y-axis, a longitudinal axis and/or x-axis, and a vertical axis and/or z-axis of the two-wheeled vehicle); and/or the form of an acceleration sensor, in particular, a 3-D acceleration sensor (which is configured to measure, in each instance, accelerations in the direction of the transverse axis, the longitudinal axis, and the vertical axis of the two-wheeled vehicle); and/or the form of a spring deflection sensor of a suspension fork, and/or a distance sensor (e.g., radar and/or ultrasonic and/or optical sensor), and/or vibration sensor for determining ground contact, and/or inclination sensor, and/or sensor for satellite-aided navigation (e.g., GPS), and/or air-pressure sensor of the electrically propelled two-wheeled vehicle.

In accordance with an example embodiment of the present invention, it is particularly advantageous for the electrically propelled two-wheeled vehicle to include a longitudinal speed sensor, which is configured to measure a longitudinal speed of the electrically propelled two-wheeled vehicle. The longitudinal speed sensor advantageously takes the form of a wheel speed sensor, which generates, for example, one pulse per wheel revolution; and/or of a sensor for satellite-aided navigation (e.g., a GPS sensor); and/or of a rate-of-rotation sensor. The evaluation unit is further configured to ascertain the amplification factor as a function of a longitudinal speed determined on the basis of the longitudinal speed sensor. This is based on the knowledge that the risk of lift-off of the front wheel due to a limited driving power of the electrically propelled two-wheeled vehicle decreases with increasing longitudinal speed of the bicycle. Accordingly, at higher longitudinal speeds, it is possible to set the amplification factor lower, which, with increasing values, increasingly reduces the drive torque in the present description, which means that possible erroneous actions by the evaluation unit are decreased or prevented at higher speeds. A relationship between the amplification factor and the longitudinal speed of the electrically propelled two-wheeled vehicle is set, for example, as a linear or nonlinear characteristic and/or as a look-up table, etc., and is usable by the evaluation unit.

In accordance with an example embodiment of the present invention, the device for influencing the drive torque is preferably an electric drive motor of the electrically propelled two-wheeled vehicle. Alternatively, or in addition, the device is a brake system and/or a drive-train gear ratio of the electrically propelled two-wheeled vehicle, which may each be used in accordance with the amplification factor to reduce a current drive torque of the electrically propelled two-wheeled vehicle. It is further preferable for the electrically propelled two-wheeled vehicle to be an electric bicycle, a pedelec, an electric motorcycle, or an electric scooter, without limiting, in this manner, the electrically propelled two-wheeled vehicle to above-mentioned specific embodiments.

In accordance with an example embodiment of the present invention, a method for adjusting a drive torque of an electrically propelled two-wheeled vehicle is also provided. In a first step of the method according to the present invention, a pitch rate of the electrically propelled two-wheeled vehicle, which represents a pitch rate of the electrically propelled two-wheeled vehicle with respect to the surroundings, in particular, with respect to the horizon, is compared to a predefined, static pitch rate threshold value. In a second step of the method according to the present invention, a drive torque acting upon a drive train of the electrically propelled two-wheeled vehicle is reduced with the aid of a predefined amplification factor, if a pitch rate (that is, negative pitch rate) generated by an upward movement of the front wheel of the electrically propelled two-wheeled vehicle exceeds the predefined pitch rate threshold value (in the negative direction).

The pitch rate is advantageously controlled in view of a predefined pitch rate threshold value. In certain driving situations, this allows a pitch rate control target differing from 0°/s to be used, in order to attain a correspondingly higher flexibility with regard to the control.

The amplification factor is preferably ascertained as a function of a longitudinal speed, which is measured with the aid of a longitudinal speed sensor of the electrically propelled two-wheeled vehicle. In this manner, it is possible, for example, to set the amplification factor lower at higher longitudinal speeds, since as a rule, the risk of lift-off of a front wheel decreases with increasing longitudinal speed.

In accordance with an example embodiment of the present invention, it is further advantageous for the amplification factor to be ascertained on the basis of a rate of rotation about a transverse axis and/or a vertical axis and/or a longitudinal axis; and/or on the basis of an acceleration in the direction of the transverse axis and/or in the direction of the vertical axis and/or in the direction of the longitudinal axis; and/or on the basis of a wheel speed and/or a change in the wheel speed; and/or on the basis of an odometric signal of an odometric sensor; and/or on the basis of a currently used gear of a gearshift mechanism of the electrically propelled two-wheeled vehicle.

In addition, the method of an example embodiment of the present invention preferably includes the following method steps: predicting future lift-off of the front wheel of the electrically propelled two-wheeled vehicle from a road surface, while the front wheel is in contact with the road surface; and adjusting a setpoint drive torque as a function of a result of the prediction. Such precontrol allows lift-off of the front wheel of the electrically propelled two-wheeled vehicle to be reduced further or prevented completely, since a control action is not carried out only when lift-off of the front wheel already present is ascertained on the basis of the pitch rate, but already when lift-off of the front wheel is imminent on the basis of input variables used for this. A control action may be carried out correspondingly earlier, and a level of safety may be increased correspondingly further during operation of the electrically propelled two-wheeled vehicle. In principle, at least variables, which are described above and are used to control the pitch rate, are considered as input variables, without being limited to them.

In addition, it is possible for a specific accuracy of rate-of-rotation signals and/or of acceleration signals and/or of odometric signals to be improved, using a sensor fusion algorithm, in that the sensor fusion algorithm merges a portion or all of the above-mentioned signals with each other in a suitable manner. The sensor fusion algorithm is advantageously based on a Kalman filter, in which a change in a state vector is calculated from the rate-of-rotation signals of a rate-of-rotation sensor, preferably, a 3-D rate-of-rotation sensor. An expected odometric signal and an expected acceleration signal may be computed from this state vector. These are compared to respectively measured odometric and acceleration values, in order to carry out a correction of the state vector. In this manner, absolute values of angles and speeds may also be ascertained without known starting values. Since the signal of the rate of rotation, specific to the two-wheeled vehicle, about the transverse axis of the electrically propelled two-wheeled vehicle does not always include just the change in pitch angle relative to the horizon, but also has, on the contrary, components of the yaw rate of the two-wheeled vehicle during cornering, due to the roll angle of the two-wheeled vehicle, then, in the case of use of this signal, an additional logic circuit is necessary, which prevents erroneous actions in this regard in cornering situations. If this is also taken into account appropriately in the sensor fusion algorithm, then it provides, as output variables, inter alia, a pitch rate signal, from which the effects of cornering are removed, and which corresponds to the above-described, horizon-based pitch rate signal. The output variables of the sensor fusion algorithm may subsequently be used in a particularly advantageous manner for the method described above.

In a further refinement of the method according to the present invention, the method additionally includes the following method steps: ascertaining a desired lift-off of the front wheel of the electrically propelled two-wheeled vehicle from a road surface on the basis of predefined criteria (e.g., by the touch of a button, and/or by pulling up the handlebars of the two-wheeled vehicle while not pedaling, and/or by a signal of a spring deflection sensor, which exceeds a predefined spring deflection threshold value, etc.); and preventing the drive torque from decreasing and instead aiding the lift-off of the front wheel, provided that the predefined criteria are satisfied. In this manner, desired lift-off of the front wheel is explicitly allowed in certain situations, e.g., when wanting to get over an obstacle, such as a curb, etc.

In one particularly advantageous refinement of the method according to the present invention, the drive torque is only reduced, when user acceptance of the reduction in the drive torque is present and/or a current longitudinal acceleration of the electrically propelled two-wheeled vehicle exceeds a predefined longitudinal acceleration threshold value (since lift-off of the front wheel due to a drive torque is always associated with a corresponding longitudinal acceleration) and/or the pitch rate exceeds a predefined, dynamic pitch rate threshold value, which is ascertained as a function of an expected maximum change in gradient that is determined, e.g., on the basis of a position information item of the two-wheeled vehicle and of map material, of a road surface in the region of the electrically propelled two-wheeled vehicle, of a current longitudinal speed of the electrically propelled two-wheeled vehicle, and of a wheel base of the electrically propelled two-wheeled vehicle, which means that gradient-dependent, erroneous interventions in the drive torque may be prevented. Through the use of individual or all of the above-mentioned boundary conditions for reducing the drive torque, it is only possible to carry out such an action, when it is actually necessary and/or desired. This allows both the safety and the ride comfort of the electrically propelled two-wheeled vehicle to be improved further.

In one further advantageous refinement of the present invention, values of specific setpoint drive torques calculated on the basis of the amplification factor are smoothed with the aid of filtering, so that vibrations in the drive train, which may affect the ride comfort, are prevented. Alternatively, or in addition, the values of specific setpoint drive torques are limited in such a manner, that only a reduction in the drive torque is rendered possible.

BRIEF DESCRIPTION OF THE DRAWINGS

In the following, exemplary embodiments of the present invention are described in detail with reference to the figures.

DETAILED DESCRIPTION OF EXAMPLE EMBODIMENTS

Figure 1:
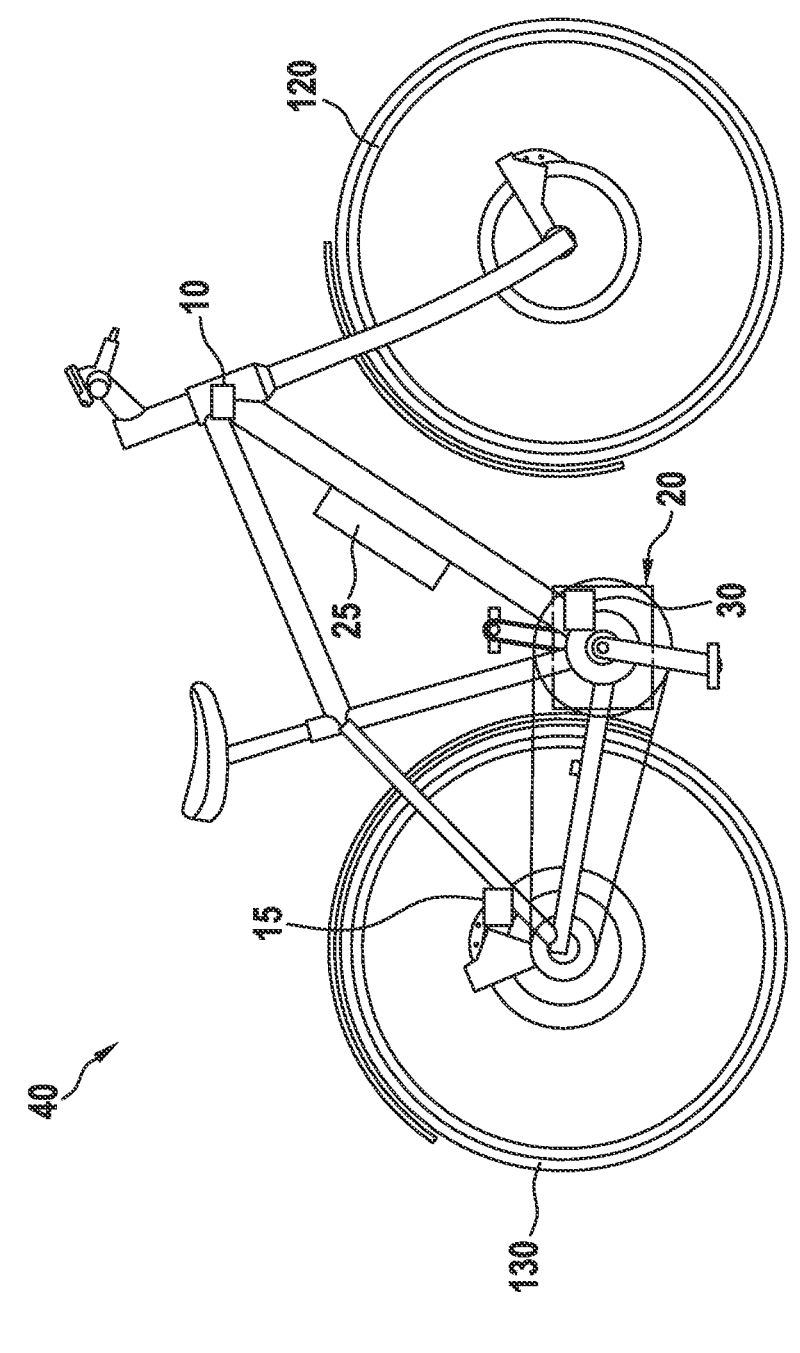
FIG. 1 shows a schematic representation of an electrically propelled two-wheeled vehicle according to a first exemplary embodiment of the present invention.

With reference to FIG. 1, an electrically propelled two-wheeled vehicle of the present invention, which takes, in this case, the form of an electric bicycle (also referred to as an "e-bike"), is described below in accordance with a first preferred exemplary embodiment of the present invention.

As is shown in FIG. 1, the electric bicycle includes a rate-of-rotation sensor 10, which is configured to measured rotations of the electric bicycle about a transverse axis, about a longitudinal axis, and about a vertical axis of the electric bicycle.

In addition, the electric bicycle includes a wheel speed sensor 15, which is situated on a frame of the electric bicycle, near a rear wheel 130, and which is configured to generate a wheel speed pulse with each full revolution of rear wheel 130.

In addition, the electric bicycle has an electric motor 20, which is configured to influence a drive torque T of the electric bicycle. Electric motor 20 is supplied with electric power with the aid of a battery 25 of the electric bicycle.

In addition, the electric bicycle includes an evaluation unit 30, which takes, in this case, the form of a microcontroller, and which is connected to rate-of-rotation sensor 10, wheel speed sensor 15 and electric motor 20 (and/or to an unshown control unit of electric motor 20) in a manner allowing information to be exchanged.

In this manner, evaluation unit 30 is able to ascertain a pitch rate $\dot{\theta}$ of the electric bicycle from an information item about a rotation of the electric bicycle about the transverse axis and an information item about the rotation of the electric bicycle about the vertical axis, which are each provided by rate-of-rotation sensor 10; the pitch rate of the electric bicycle representing a pitch rate $\dot{\theta}$ of the electric bicycle relative to the horizon.

In addition, evaluation unit 30 is able to ascertain a longitudinal speed $v_x$ of the electric bicycle on the basis of the wheel speed pulses of wheel speed sensor 15.

Evaluation unit 30 is additionally configured to compare ascertained pitch rate $\dot{\theta}$ to a predefined, static pitch rate threshold value THR1, which is stored in a storage unit (not shown) that is connected to evaluation unit 30 so as to be able to exchange information.

In addition, evaluation unit 30 is configured to reduce the drive torque T acting upon a drive train of the electric bicycle, with the aid of a predefined amplification factor F, if a pitch rate $\dot{\theta}$ (a negative value) generated by an upward movement of a front wheel 120 of the electric bicycle exceeds static pitch rate threshold value THR1 in the negative direction.

The predefined amplification factor F used in this case is ascertained with the aid of evaluation unit 30 as a function of, in addition, the longitudinal speed $v_x$ determined on the basis of wheel speed sensor 15. In this exemplary embodiment, a look-up table is used for this, in which for specific longitudinal speed values and/or ranges of longitudinal speed values, in each instance, corresponding, predefined amplification factors F are stored, which are selected and used by evaluation unit 30 in accordance with current longitudinal speed $v_x$.

In light of the description of the first exemplary embodiment, it is apparent that lift-off of front wheel 120 of the electric bicycle is reduced or even prevented in a particularly reliable manner. In addition, the use of the pitch rate according to the present invention prevents, inter alia, existing roadway gradients from having a lasting effect on a reduction in the drive torque. In addition, by taking longitudinal speed $v_x$ into account, the drive torque is advantageously reduced mainly only in situations, in which there is actually a risk of lift-off of the front wheel (that is, in ranges of low speeds).

Figure 2:
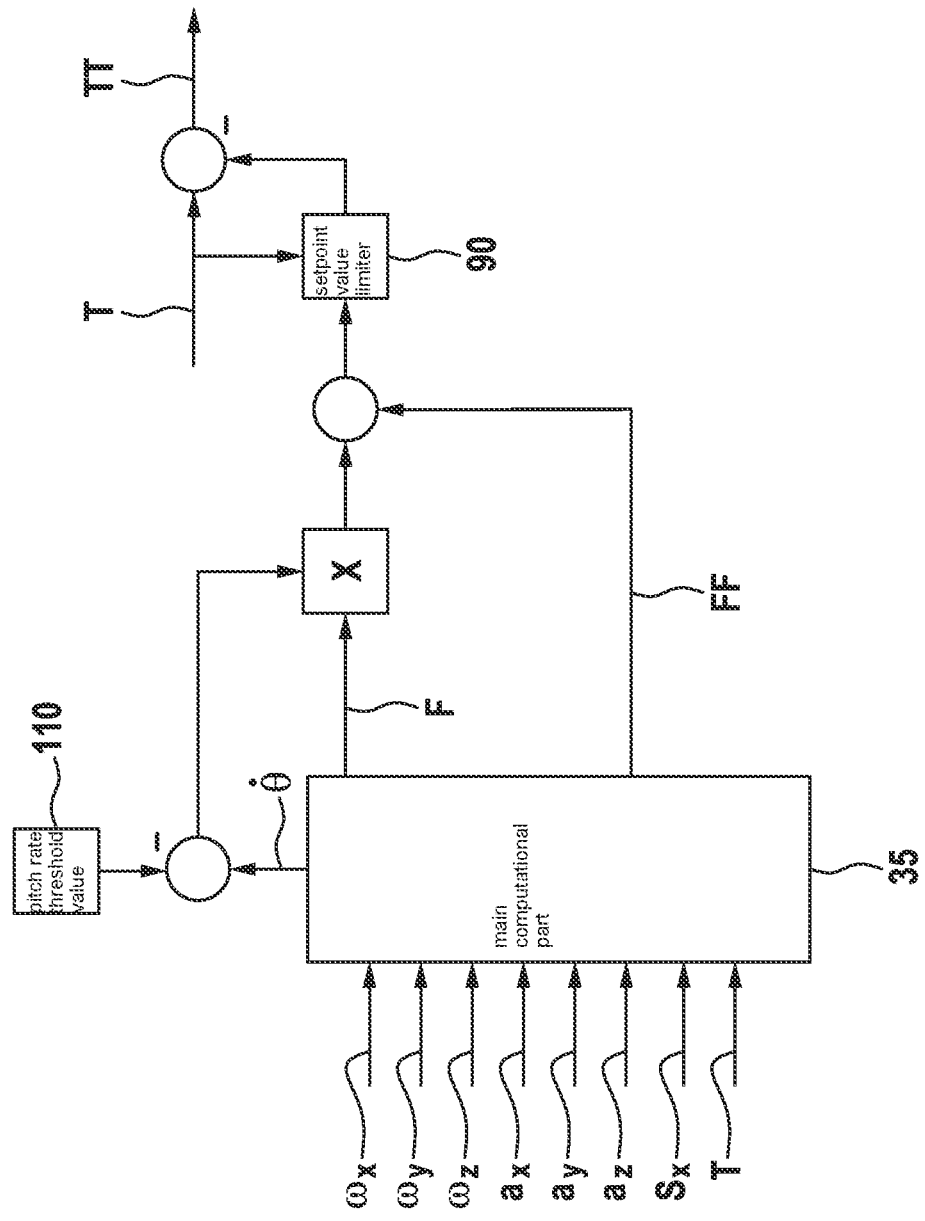
FIG. 2 shows a signal flow diagram for illustrating a method of the present invention for adjusting a drive torque of an electrically propelled two-wheeled vehicle according to a second exemplary embodiment of the present invention.

FIG. 2 shows a signal flow diagram to illustrate a method of the present invention for adjusting a drive torque of an electrically propelled two-wheeled vehicle, which is, in this case, an electric bicycle, according to a second exemplary embodiment of the present invention.

It should be pointed out that the logic circuit forming the basis of the signal flow diagram is implemented in the form of a computer program, which is executed with the aid of an evaluation unit 30 of the present invention.

In a first step of the method according to the present invention, a pitch rate $\dot{\theta}$, which represents a pitch rate $\dot{\theta}$ of the electric bicycle relative to the horizon, and which is ascertained on the basis of signals of a 3-D rate-of-rotation sensor of the bicycle, is compared to a predefined, static pitch rate threshold value THR1.

In a second step of the method according to the present invention, a drive torque T acting upon a drive train of the electrically propelled two-wheeled vehicle is reduced with the aid of a predefined amplification factor F, if a pitch rate $\dot{\theta}$ generated by an upward movement of a front wheel 120 of the electric bicycle exceeds predefined pitch rate threshold value THR1.

For this, in this exemplary embodiment, 3-D angular speed signals $\omega_x$, $\omega_y$, and $\omega_z$ of a rate-of-rotation sensor 10, 3-D acceleration signals $a_x$, $a_y$, $a_z$ of an acceleration sensor (not shown), and an odometric signal $S_x$ of an odometric sensor (not shown), which takes the form, for example, of a wheel speed sensor 15, are received by a main computational part 35 of the signal flow diagram.

On the basis of angular speed signals $\omega_x$, $\omega_y$, $\omega_z$, acceleration signals $a_x$, $a_y$, $a_z$, and odometric signal $S_x$, main computational part 35 is configured to ascertain, inter alia, a particularly accurate pitch rate $\dot{\theta}$, using a sensor fusion algorithm, which employs Kalman filtering; the pitch rate representing a pitch rate $\dot{\theta}$ independent of cornering.

Ascertained pitch rate $\dot{\theta}$ is subsequently compared to a pitch rate threshold value 110, which corresponds to a value of 0°/s in this case, in order to prevent the front wheel of the electric bicycle from lifting off.

In addition, main computational part 35 is configured to determine an amplification factor F and a precontrol signal FF on the basis of signals mentioned above and on the basis of a current drive torque T of the electric bicycle.

In particular, amplification factor F is calculated as a function of a longitudinal speed $v_x$ of the electric bicycle, which is ascertainable with a particular accuracy on the basis of the above-described sensor fusion algorithm, as well.

Amplification factor F is calculated in such a manner, that multiplication of the amplification factor by pitch rate $\dot{\theta}$, which has been compared to pitch rate threshold value 110, yields a reduction torque, which is subtracted from the drive torque T currently present, in order to obtain a setpoint drive torque TT, which is used for controlling an assisting motor 20 of the electric bicycle.

Precontrol signal FF results from a prediction logic circuit of main computational part 35; the prediction logic circuit being able to predict future lift-off of a front wheel 120 of the electric bicycle from a road surface, while front wheel 120 is still in contact with the road surface. Precontrol signal FF is subsequently used for adjusting setpoint drive torque TT as a function of a result of the prediction.

With the aid of a setpoint value limiter 90, it is further ensured that an ascertained value of the reduction torque does not take on any negative values, which means that during a subsequent comparison of the reduction torque with current drive torque T, no setpoint drive torque TT is yielded, which is greater than current drive torque T.

In addition, a desired lift-off of front wheel 120 from a road surface is advantageously ascertained, for example, by additionally evaluating a signal of a spring deflection sensor (not shown) of a suspension fork of the electric bicycle, on the basis of which intentional "pulling-up" of the handlebars (e.g., for riding over a curb) is ascertainable. In this case, the automatic control for preventing the front wheel from lifting off is advantageously interrupted at least in the short term, in order to allow the intentional lift-off of the front wheel. In addition, it is also possible for the desired lift-off of the front wheel to be actively assisted, by adjusting the automatic control.

One advantage of the second exemplary embodiment is, inter alia, that due to the sensor fusion algorithm, input variables used to control the drive torque on the basis of pitch rate are provided with a particularly high accuracy, and that due to the use of the prediction logic circuit, lift-off of the front wheel may be suppressed in a particularly effective manner.

Figure 3:
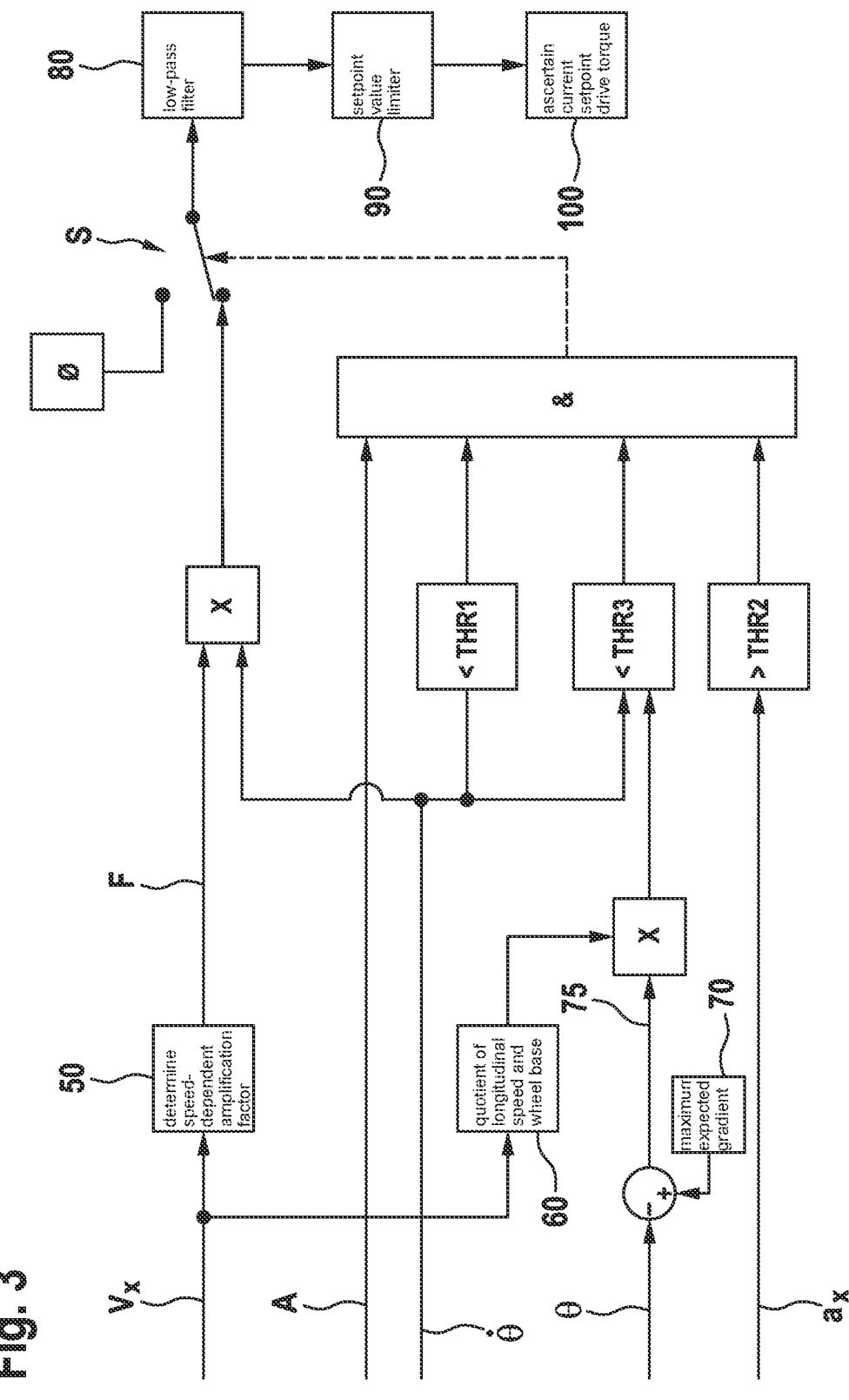
FIG. 3 shows a signal flow diagram for illustrating a method of the present invention for adjusting a drive torque of an electrically propelled two-wheeled vehicle according to a third exemplary embodiment of the present invention.

FIG. 3 shows a signal flow diagram to illustrate a method of the present invention for adjusting a drive torque of an electrically propelled two-wheeled vehicle, which is, in this case, an electric bicycle, according to a third exemplary embodiment of the present invention.

Based on a current longitudinal speed $v_x$ of the electric bicycle, a speed-dependent amplification factor F is determined by the block 50 of the signal flow diagram on the basis of a look-up table; the amplification factor being multiplied subsequently by a current pitch rate $\dot{\theta}$ of the electric bicycle.

When drive torque control is activated, a value of a reduction torque resulting from the multiplication is initially transmitted across switch S to a low-pass filter 80, in which consecutive values of reduction torques are smoothed for increased ride comfort.

A result of the filtering by low-pass filter 80 is subsequently processed by a setpoint value limiter 90, which ensures that the values of the reduction torque only result in a reduction of a current drive torque T.

A result of setpoint value limiter 90 is subsequently used to ascertain, in block 100, a current setpoint drive torque for the electric bicycle, which is used for preventing unwanted lift-off of the front wheel.

A specific switching state of switch S is influenced by boundary conditions, which are described below and must be satisfied simultaneously by an AND operation, in order for switch S to prevent the front wheel of the electric bicycle from lifting off on the basis of a pitch rate. In this manner, any erroneous actions due to this control may be prevented in certain situations.

For this, it is necessary, first of all, for an activation signal A to represent an active state. With the aid of, for example, a user input to an operating unit of the electric bicycle, activation signal A is set to active. In this manner, a user of the electric bicycle is put in the position to manually activate and/or deactivate, as required, the prevention of lift-off of the front wheel on the basis of pitch rate.

In addition, it is necessary for pitch rate $\dot\theta$, which, according to the definition used here, corresponds to a negative value during an upward movement of front wheel 120 of the electric bicycle, to be less than a negative value of a predefined, static pitch rate threshold value THR1. This boundary condition is intended for preventing erroneous actions on the basis of slight pitching movements of the electric bicycle, which are not caused by lift-off of the front wheel, but by, for example, pedaling, excitation from the ground, or chassis vibrations.

Furthermore, it is necessary for a longitudinal acceleration $a_x$ of the electric bicycle to be greater than a longitudinal acceleration threshold value THR2, since lift-off of the front wheel by a drive torque T is always associated with a certain longitudinal acceleration.

In addition, it is necessary for erroneous actions to be prevented in the case of changes in gradient. For this, a maximum expected change in gradient 75 is ascertained from current pitch angle $\theta$ and a value of a maximum expected gradient 70. This is multiplied by a quotient 60 of longitudinal speed $v_x$ and a wheel base of the electric bicycle. A result of this calculation, it is subsequently compared to a predefined, dynamic pitch rate threshold value THR3, which is additionally compared to current pitch rate $\dot\theta$ of the electric bicycle.

If all of the boundary conditions are satisfied, switch S is moved into a switch position, in which the above-described reduction torque is transmitted to the low-pass filter.

Otherwise, switch S is moved into a switch position, in which a predefined reduction torque of 0 Nm is transmitted to the low-pass filter, through which the automatic control of the present invention on the basis of pitch rate is deactivated.

The third exemplary embodiment provides, inter alia, the advantage that the control of the drive torque on the basis of pitch rate is only active, when specific boundary conditions for it are satisfied. In this manner, it is possible to prevent any erroneous actions by the control system and/or control actions that reduce ride comfort.

What is claimed is:

1. An electrically propelled two-wheeled vehicle, comprising:
   a sensor, on the basis of which a pitch rate of the electrically propelled two-wheeled vehicle is ascertainable;
   a device configured to influence a drive torque of the electrically propelled two-wheeled vehicle; and an evaluator configured to:
   compare the pitch rate, which is ascertained on the basis of the sensor and represents a pitch rate of the electrically propelled two-wheeled vehicle relative to surroundings of the electrically propelled two-wheeled vehicle, to a predefined, static pitch rate threshold value; and
   proactively reduce the drive torque acting upon a drive train of the electrically propelled two-wheeled vehicle using a predefined amplification factor, if a pitch rate generated by an upward movement of a front wheel of the electrically propelled two-wheeled vehicle exceeds the static pitch rate threshold value,
   wherein the proactive reduction is initiated based on the pitch rate on a prediction of imminent lift-off of the front wheel while the front wheel remains in contact with a road surface, thereby preventing a wheelie before lift-off occurs, and distinguishing from a static feedback control that merely maintains a predefined angle.

2. The electrically propelled two-wheeled vehicle as recited in claim 1, wherein the sensor is:
   a rate-of-rotation sensor of the electrically propelled two-wheeled vehicle; and/or
   an acceleration sensor of the electrically propelled two-wheeled vehicle; and/or
   a spring deflection sensor of a suspension fork of the electrically propelled two-wheeled vehicle; and/or
   a distance sensor of the electrically propelled two-wheeled vehicle; and/or
   a vibration sensor of the electrically propelled two-wheeled vehicle; and/or
   an inclination sensor of the electrically propelled two-wheeled vehicle; and/or
   a sensor for satellite-aided navigation of the electrically propelled two-wheeled vehicle; and/or
   an air pressure sensor of the electrically propelled two-wheeled vehicle.

3. The electrically propelled two-wheeled vehicle as recited in claim 1, further comprising at least one longitudinal speed sensor, wherein:
   the longitudinal speed sensor is configured to measure a longitudinal speed of the electrically propelled two-wheeled vehicle; and
   the evaluator is configured to ascertain the amplification factor as a function of a longitudinal speed determined on the basis of the longitudinal speed sensor.

4. The electrically propelled two-wheeled vehicle as recited in claim 1, wherein:
   the device for influencing the drive torque is an electric drive motor of the electrically propelled two-wheeled vehicle, and/or a brake system of the electrically propelled two-wheeled vehicle, and/or a drive train gear ratio of the electrically propelled two-wheeled vehicle.

5. The electrically propelled two-wheeled vehicle as recited in claim 1, wherein the pitch rate is ascertained independent of cornering, the pitch rate derived from angular speed signals using a sensor fusion algorithm.

6. The electrically propelled two-wheeled vehicle as recited in claim 1, wherein:
   the electrically propelled two-wheeled vehicle is an electric bicycle or a pedelec or an electric motorcycle or an electric scooter.

7. A method for adjusting a drive torque of an electrically propelled two-wheeled vehicle, comprising the following steps:
   comparing a pitch rate, which represents a pitch rate of the electrically propelled two-wheeled vehicle relative to surroundings of the electrically propelled two-wheeled vehicle, to a predefined, static pitch rate threshold value; and proactively reducing a drive torque acting upon a drive train of the electrically propelled two-wheeled vehicle using a predefined amplification factor, when a pitch rate generated by an upward movement of a front wheel of the electrically propelled two-wheeled vehicle exceeds the predefined pitch rate threshold value, wherein the proactive reduction is initiated based on the pitch rate on a prediction of imminent lift-off of the front wheel while the front wheel remains in contact with a road surface, thereby preventing a wheelie before lift-off occurs, and distinguishing from a static feedback control that merely maintains a predefined angle.

8. The method as recited in claim 7, wherein the pitch rate is controlled in view of a predefined setpoint pitch rate value.

9. The method as recited in claim 7, wherein the amplification factor is ascertained as a function of a longitudinal speed, which is measured using a longitudinal speed sensor of the electrically propelled two-wheeled vehicle.

10. The method as recited in claim 7, wherein the amplification factor is ascertained based on:

a rate of rotation about a transverse axis and/or about a vertical axis and/or about a longitudinal axis; and/or an acceleration in the direction of the transverse axis and/or the vertical axis and/or the longitudinal axis; and/or a wheel speed; and/or a change in the wheel speed; and/or an odometric value; and/or a gear, currently used, of a gearshift mechanism of the electrically propelled two-wheeled vehicle.

11. The method as recited in claim 7, further comprising:

predicting future lift-off of a front wheel of the electrically propelled two-wheeled vehicle from a road surface, while the front wheel is in contact with a road surface; and adjusting a setpoint drive torque as a function of a result of the prediction.

12. The method as recited in claim 7, wherein a specific accuracy of rate-of-rotation signals and/or of acceleration signals and/or of odometric signals is improved, using a sensor fusion algorithm, in that the sensor fusion algorithm merges a portion or all of the rate-of-rotation signals and/or the acceleration signals and/or the odometric signals with each other.

13. The method as recited in claim 7, further comprising:

ascertaining a desired lift-off of the front wheel of the electrically propelled two-wheeled vehicle from a road surface based on predefined criteria; and preventing the drive torque from decreasing, and aiding the lift-off of the front wheel, based on the predefined criteria being satisfied.

14. The method as recited in claim 7, wherein the drive torque is reduced only when:

a user enables the reduction in the drive torque; and/or a current longitudinal acceleration of the electrically propelled two-wheeled vehicle exceeds a predefined longitudinal acceleration threshold value; and/or the pitch rate exceeds a predefined dynamic pitch rate threshold value, which in ascertained as a function of an expected, maximum change in gradient of a road surface in an area of the electrically propelled two-wheeled vehicle;

a current longitudinal speed of the electrically propelled two-wheeled vehicle; and a wheel base of the electrically propelled two-wheeled vehicle.

15. The method as recited in claim 7, wherein values of specific setpoint drive torques ascertained based on the amplification factor are:

smoothed using filtering; and/or limited using a predefined setpoint value limiter in such a manner, that only a reduction in the drive torque is rendered possible.

\* \* \* \* \*